US007088827B1

(12) United States Patent
Vishwamitra

(10) Patent No.: US 7,088,827 B1
(45) Date of Patent: Aug. 8, 2006

(54) RECONFIGURABLE SPEAKER SYSTEM

(75) Inventor: Tejaswi Vishwamitra, Cincinnati, OH (US)

(73) Assignee: Broan-NuTone LLC, Hartford, WI (US)

( * ) Notice: Subject to any disclaimer, the term of this patent is extended or adjusted under 35 U.S.C. 154(b) by 0 days.

(21) Appl. No.: 09/456,676

(22) Filed: Dec. 9, 1999

(51) Int. Cl.
*H04R 5/00* (2006.01)
*H02B 1/00* (2006.01)

(52) U.S. Cl. ............................ 381/1; 381/17; 381/123; 381/99

(58) Field of Classification Search .................... 381/1, 381/17, 18, 19, 300, 307, 27, 123, 99, 81, 381/80, 401, 107, 101, 182
See application file for complete search history.

(56) References Cited

U.S. PATENT DOCUMENTS 2,168,426 A 8/1939 Marr ............................ 179/1
3,944,941 A * 3/1976 Tsuda .......................... 330/51
4,181,819 A 1/1980 Cammack ...................... 179/1
4,462,112 A * 7/1984 Watanabe ................... 381/109
4,468,806 A 8/1984 Gaulden et al. ............ 381/123
4,481,660 A 11/1984 de Koning et al. ........... 381/58
4,555,797 A 11/1985 Nieuwendijk et al. ....... 381/117
4,566,120 A 1/1986 Nieuwendijk et al. ....... 381/117
4,612,420 A 9/1986 Nieuwendijk et al. ... 179/115.5
4,831,652 A * 5/1989 Anderson et al. .............. 381/1
4,856,065 A * 8/1989 Takagi et al. ................. 381/28
5,042,068 A * 8/1991 Scholten et al. ............... 381/1
5,056,148 A 10/1991 Hayashi ....................... 381/11
5,140,637 A * 8/1992 McCarthy ...................... 381/1
5,181,247 A * 1/1993 Holl ........................... 381/306
5,212,732 A * 5/1993 Hipps et al. .................. 381/89
5,394,472 A * 2/1995 Broadie ......................... 381/1
5,400,405 A * 3/1995 Petroff ........................... 381/1
5,414,774 A * 5/1995 Yumoto ......................... 381/1
5,515,442 A 5/1996 Dombrowski, Jr. ........... 381/11
5,856,759 A 1/1999 Krochmal ............... 330/124 R
5,872,855 A 2/1999 Porrazzo et al. ............ 381/400
5,875,255 A * 2/1999 Campbell ................... 381/345
6,118,876 A * 9/2000 Ruzicka ....................... 381/18
6,219,426 B1 * 4/2001 Daniels et al. .............. 381/307
6,259,799 B1 * 7/2001 Suzuki et al. ............... 381/401
6,332,026 B1 * 12/2001 Kuusama et al. ............. 381/17

* cited by examiner

*Primary Examiner*—Xu Mei
(74) *Attorney, Agent, or Firm*—Michael Best & Friedrich LLP

(57) ABSTRACT

A reconfigurable speaker system for producing sound in response to at least one of right and left channel audio signals generated by an audio source. The speaker system can be configured by the user to simultaneously reproduce right and left channel audio information from a single speaker, or the speaker system can be configured to reproduce right and left channel audio information independently from a pair of speakers. The speaker system includes a dual voice coil woofer and a pair of independent tweeters. A switch device is provided in circuit with the woofer and pair of tweeters so that in one position of the switch device, the dual voice coil woofer is configured to produce sound in response to both of the right and left channel audio signals, and each tweeter in the tweeter pair is configured to produce sound in response to a respective one of the right and left channel audio signals. In a second position of the switch device, the dual voice coil woofer is configured to produce sound in response to only one of the right and left channel audio signals, and both of the tweeters are configured to produce sound in response to the same right or left channel as the woofer. The speaker system is designed so that the sound pressure level of the speaker is the same in either of the two uses selected configurations.

24 Claims, 3 Drawing Sheets

RECONFIGURABLE SPEAKER SYSTEM

FIELD OF THE INVENTION

The present invention relates generally to sound reproduction systems and, more particularly, to a speaker system and method for producing sound in response to an audio signal generated by an audio source.

BACKGROUND OF THE INVENTION

Various speaker systems have been designed in the past to handle a wide range of acoustic needs. For example, when high-fidelity sound reproduction is not critical, a speaker may be designed with only one audio driver or speaker cone so that all of the high, midrange and low audio frequencies are handled by the single speaker. Unfortunately, single cone speakers, referred to as wide range speakers, tend to exhibit some distortion since a small speaker cone will generally handle high frequencies well, while a large speaker cone is typically better suited to handle the lower frequencies. Thus, a wide range speaker is generally not well adapted to reproduce the full frequency spectrum of audio information with high-fidelity. Rather, the higher or lower frequency range is reproduced with more quality as a function of the speaker cone size.

To overcome this problem, high-fidelity speakers are designed to include two or more speaker cones in the speaker. In a two-way speaker, for example, a small tweeter reproduces the high frequencies, and a relatively large woofer handles the low frequencies. In a three-way speaker, a third or midrange speaker cone is added to improve coverage of middle frequencies between the highs of the tweeter and the lows of the woofer. A crossover network or special filtering circuit is generally used to separate the audio signal frequencies and feed them to the appropriate high, low or midrange audio driver in the speaker.

Additionally, depending on the specific acoustic needs of the listener, one, two or four speakers may be required to reproduce the desired audio program. For example, when high-fidelity sound reproduction is desired from both right and left channel audio signals of a stereo system, two speakers are connected to the stereo system to produce a true stereo acoustic environment. In particular, a true stereo system uses two independent speakers with each speaker reproducing one or the other of the right and left channel audio information. In this way, right channel audio information is reproduced by one speaker along a right audio axis while left channel audio information is reproduced by the other speaker along a left audio axis to produce a true stereo effect to the listener.

In some rooms however, such as in a confined bathroom or attic for example, it may be difficult to use two independent speakers to reproduce the right and left channel audio information. In such cases, a single speaker may be used which is connected to only one of the right or left audio channels of the audio source. Thus, while the single speaker is able to reproduce sound within the room, the reproduced audio program is less than ideal as the audio information from one or the other of the right and left audio channels is missing entirely from the audio program.

To address this problem, dual voice coil speakers have recently been developed that include a single speaker cone with a pair of independent voice coils to drive the single cone. The dual voice coil speaker is designed so that both of the right channel and left channel audio signals are handled separately by the independent voice coils so that none of the audio information is discarded or sacrificed by the speaker. The right and left channel audio signals are mixed within the single speaker so that right and left channel audio programs are simultaneously reproduced by the single speaker. Unfortunately, however, dual voice coil speakers suffer from the same drawbacks of any wide range speaker in that the single speaker cone is not well suited to reproduce all of the frequencies very well. Thus, while all of the right and left channel audio information is simultaneously reproduced by the single speaker, the reproduced audio program is considerably less than high-fidelity. Moreover, dual voice coil speakers are designed only for mixing right and left channel audio signals, and their design prohibits them from being used in a true stereo environment in which two speakers are connected to an audio source to independently reproduce the right and left audio information. Thus, dual voice coil speakers generally have a very limited application to single speaker acoustic environments.

Thus, there is a need for a speaker system that is well suited to handle a wide range of audio frequencies and reproduce an audio program with high-fidelity. There is also a need for a speaker system that reproduces an audio program without significant distortion or loss of audio information. There is also a need for a speaker system that is versatile for use in a wide range of acoustic environments in which a single or multiple speakers may be required.

SUMMARY OF THE INVENTION

The present invention overcomes the foregoing and other shortcomings and drawbacks of speaker systems and methods for reproducing sound in response to an audio signal generated by an audio source heretofore known. While the invention will be described in connection with certain embodiments, it will be understood that the invention is not limited to these embodiments. On the contrary, the invention includes all alternatives, modifications and equivalents as may be included within the spirit and scope of the present invention.

In particular, the speaker system of the present invention is reconfigurable by a user for producing sound in response to at least one of right and left channel audio signals generated by an audio source. The speaker system can be configured by the user to simultaneously reproduce right and left channel audio information from a single speaker, or the speaker system can be configured to reproduce right and left channel audio information independently from a pair of speakers.

The speaker system of the present invention includes a dual voice coil woofer and a pair of independent tweeters. A switch device is provided in circuit with the dual voice coil woofer and pair of tweeters so that in one position of the switch device, the dual voice coil woofer is configured to produce sound in response to both of the right and left channel audio signals coupled to the speaker system, and each independent tweeter in the tweeter pair is configured to produce sound in response to a respective one of the right and left channel audio signals. In a second position of the switch device, the dual voice coil woofer is configured to produce sound in response to only one of the right and left channel audio signals coupled to the speaker system, and both of the tweeters are configured to produce sound in response to same right or left channel audio signals as the woofer.

In particular, the reconfigurable speaker system of the present invention includes two pairs of audio input terminals that are each adapted to receive respective right and left channel audio signals from respective right and left audio channels of the audio source. In those environments where only one speaker system is to be used, such as in a confined bathroom space or attic for example, the two pairs of audio input terminals of the speaker system are electrically coupled to the respective left and right audio signals of the audio source. The switch device is moved by the user to an "open" position so that in this configuration of the speaker system, left channel audio information is reproduced by one voice coil within the dual voice coil woofer and one of the pair of independent tweeters, while right channel information is reproduced by the second voice coil within the dual voice coil woofer and the second independent tweeter. In this configuration, the speaker system is configured to reproduce a complete left and right audio program from a single speaker so audio information is not discarded or sacrificed by the speaker system during the sound reproduction.

Where sufficient space exists for a pair of speaker systems in a true stereo acoustic environment, a pair of speaker systems are coupled to the audio source to independently reproduce right and left audio information along separate right and left audio axes. For true stereo environments, the switch device of each speaker system is moved to a "closed" position and each speaker system is independently coupled to only one of the right or left channel audio signals of the audio source. In this second configuration, left channel audio information is reproduced by both voice coils of the dual voice coil woofer and the pair of tweeters of the left speaker, while right channel audio information is reproduced by both voice coils of the dual voice coil woofer and the pair of tweeters of the right speaker.

In this way, the speaker system of the present invention is well suited to handle a wide range of audio frequencies and reproduce an audio program with high-fidelity through the use of the dual voice coil woofer and pair of independent tweeters. When only one speaker system is coupled to the audio source, none of the audio information from the right and left channels is sacrificed or discarded so that a good quality audio program with right and left channel audio information can be reproduced by the single speaker. Moreover, the speaker system is versatile for use in a wide range of acoustic environments in which a single or multiple speakers may be required.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE PREFERRED EMBODIMENT

Figure 2:
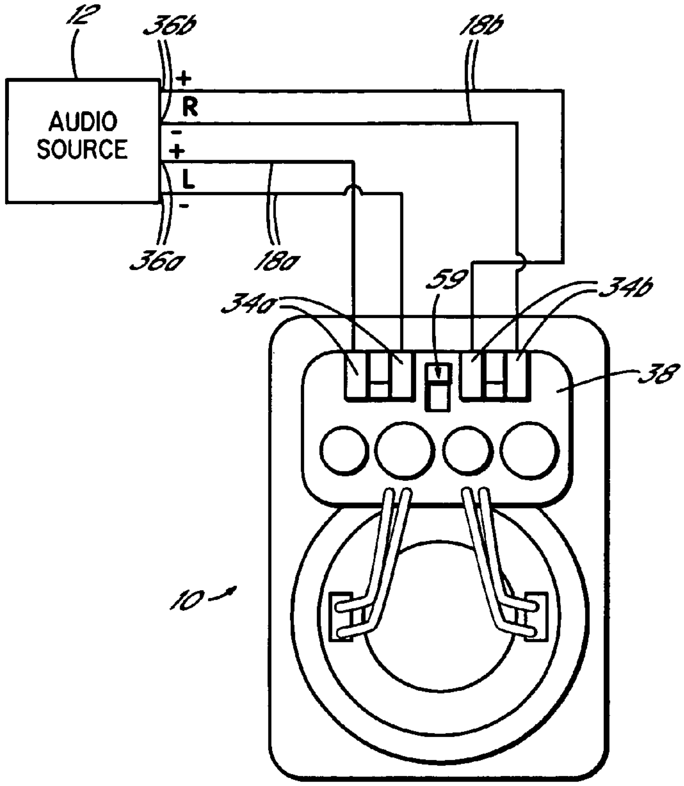
FIG. 2 is a diagrammatic rear view of the speaker system shown in FIG. 1 coupled to an audio source.
Figure 2A:
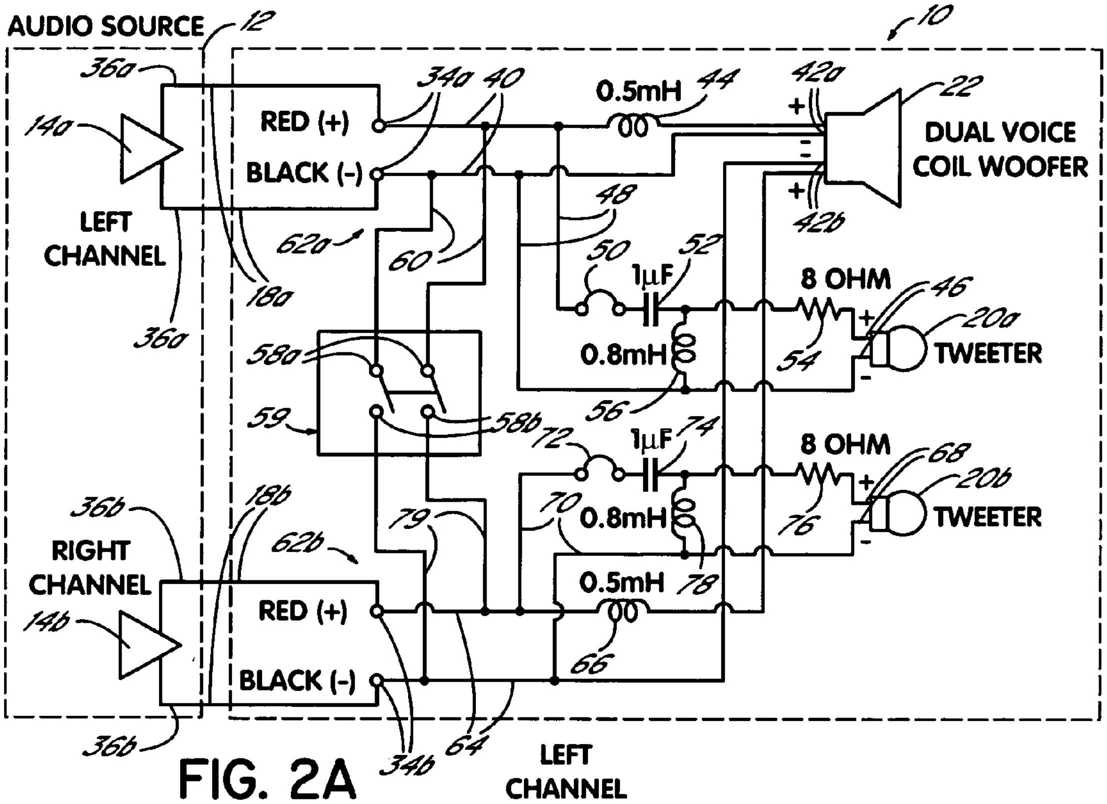
FIG. 2A is a schematic of the speaker system shown in FIG. 2 coupled to the audio source.

With reference to the figures, a reconfigurable speaker system 10 is shown in accordance with the principles of the present invention. As used herein, the term "reconfigurable" is used to describe that in one user selected configuration, speaker system 10 is configured for use as a single speaker with an audio source 12 as shown in FIGS. 2 and 2A. In this first configuration, speaker system 10 is connected to the left and right audio channels 14*a* and 14*b*, respectively, of the audio source 12 to reproduce both left and right audio information from the same single speaker system 10 as will be described in detail below. In a second user selected configuration, each speaker system 10 of a speaker pair is configured for use as an independent right or left speaker in a true stereo environment. In this second configuration, one speaker system 10 is connected to the left audio channel 14*a* of the audio source 12 to reproduce left channel audio information, while the right speaker system 10 is connected to the right audio channel 14*b* to reproduce right channel audio information from audio source 12 as described in detail below.

Figure 1:
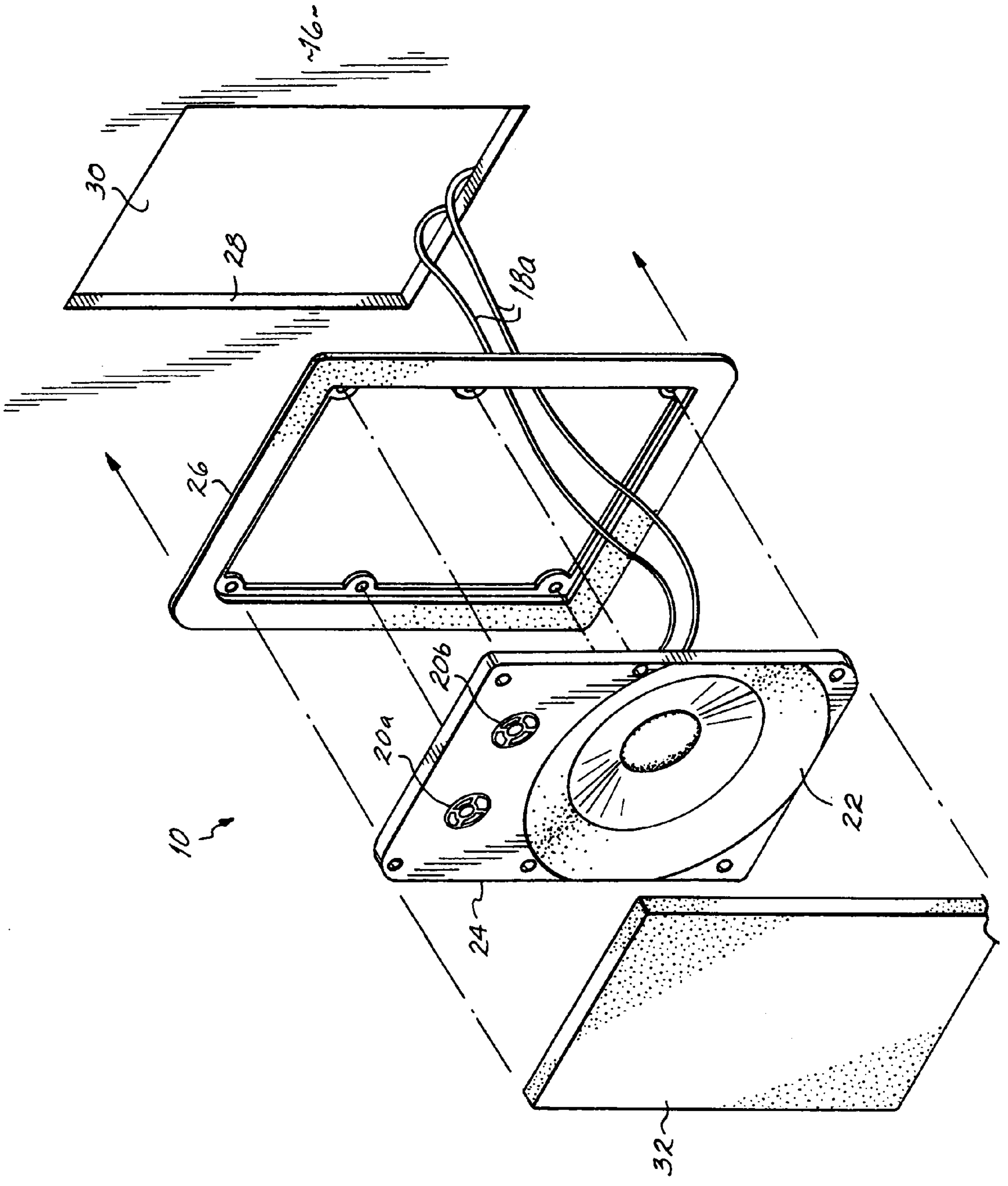
FIG. 1 is an exploded perspective view of a reconfigurable speaker system in accordance with the principles of the present invention illustrating mounting of the speaker system in a wall.

In one embodiment of the present invention as shown in FIG. 1, speaker system 10 is constructed to be mounted in a wall 16 or other structure that is conventionally used to support a speaker. Speaker system 10 is electrically coupled to the audio source 12, such as a stereo amplifier, through one or two pairs of twin-conductor speaker wires 18*a*, 18*b* (one pair shown in FIG. 1) as will be described in detail below. Speaker system 10 includes a pair of high frequency audio drivers or tweeters 20*a*, 20*b* and a single low frequency audio driver or woofer 22 that are each mounted in a conventional manner to a baffle 24. Each audio driver 20*a*, 20*b* is preferably a ¾" titanium dome tweeter having a ferrofluid cooled neodymium magnet, and the tweeters 20*a*, 20*b* are preferably mounted to swivel relative to the baffle 24 in a conventional manner to permit the user to adjust the direction of the high frequency audio information generated by the pair of tweeters 20*a*, 20*b*. The audio driver 22 is preferably a 6½" woofer having a polyesterine cone. Of course, other sizes and types of woofers and tweeters are possible without departing from the spirit and scope of the present invention. Speaker system 10 further includes a mounting frame 26 that permits the speaker to be securely positioned in a wall cut-out 28 with one or both pairs of speaker wires 18*a*, 18*b* (one pair shown in FIG. 1) extending into a cavity 30 behind the wall 16. A mesh grill 32 is provided to cover the speaker system 10 after it has been mounted in the wall cut-out 28 to provide an aesthetic appearance or finish to the speaker.

In the acoustic environment illustrated in FIGS. 2 and 2A, speaker system 10 is configured by the user for use as a single speaker in a confined space, such as in a bathroom or attic, where it may not be feasible to mount a pair of speakers for true stereo sound reproduction. To this end, speaker system 10 includes two pairs of audio input terminals 34*a*, 34*b* that are each adapted to receive respective left and right channel audio signals 36*a*, 36*b* from the left and right audio channels 14*a*, 14*b* of audio source 12 through the respective pairs of twin-conductor speaker wires 18*a*, 18*b*. Audio input terminals 34*a*, 34*b* are preferably push-in type electrical connectors conventionally used in speakers and are mounted on a printed circuit board 38 provided on a rear side of the speaker system 10. In this configuration, speaker system 10 is configured to reproduce both left and right channel audio information from the single speaker.

More particularly, the pair of audio input terminals 34*a* are electrically coupled to the pair of left channel audio signals 36*a* of audio source 12 through speaker wires 18*a*, while audio input terminals 34*b* are connected to the right channel audio signals 36*b* through speaker wires 18*b*. Of course, it will be appreciated that in another embodiment of the present invention, the electrical connection of the left and right channel audio signals 36*a*, 36*b* to the audio input terminals 34*a*, 34*b* could be reversed without departing from the spirit and scope of the present invention. As shown in FIG. 2A, the positive (+) and negative (−) audio input terminals 34*a* are electrically coupled through leads 40 to respective positive (+) and negative (−) terminals 42*a* of one of the two independent voice coils (not shown) within the dual voice coil woofer 22. A 0.50 mH inductor 44 is coupled in the positive (+) lead 40 to provide a first order Butterworth filter with a 6 dB/octave roll-off.

The positive (+) and negative (−) audio input terminals 34*a* are also electrically coupled to respective positive (+) and negative (−) terminals 46 of tweeter 20*a* of the tweeter pair through leads 48 coupled to leads 40. A fuse 50, 1 uF capacitor 52 and 8 ohm resistor 54 are coupled in series in the positive (+) lead 48, and a 0.8 mH air core inductor 56 is coupled across the positive (+) and negative (−) terminals 46 of tweeter 20*a*. The capacitor 52 and inductor 54 form a second order Butterworth filter with a 12 dB/octave roll-off. Additionally, the positive (+) and negative (−) audio input terminals 34*a* are electrically coupled to a first pair of terminals 58*a* of a switch device 59 through leads 60. As will be described in detail below, switch device 59 is preferably a double pole, single throw mechanical switch that may be readily configured by the user to either an "open" (FIG. 2A) or "closed" (FIG. 2B) position depending on the required acoustic capability of the speaker system 10. Of course, other types of mechanical and electrical switches are possible without departing from the spirit and scope of the present invention. The in circuit audio input terminals 34*a*, dual voice coil woofer 22 and tweeter 20*a* form a first speaker section within speaker system 10 that is shown generally at 62*a*.

Further referring to FIG. 2A, the positive (+) and negative (−) audio input terminals 34*b* are similarly electrically coupled through leads 64 to respective positive (+) and negative (−) terminals 42*b* of the second independent voice coil (not shown) within the dual voice coil woofer 22. A 0.50 mH inductor 66 is also coupled in the positive (+) lead 64 to provide a first order Butterworth filter with a 6 dB/octave roll-off. The positive (+) and negative (−) audio input terminals 34*b* are also similarly electrically coupled to the respective positive (+) and negative (−) terminals 68 of the second tweeter 20*b* of the tweeter pair through leads 70 coupled to leads 64. A fuse 72, 1 uF capacitor 74 and 8 ohm resistor 76 are coupled in series in the positive (+) lead 70, and a 0.8 mH air core inductor 78 is coupled across the positive (+) and negative (−) terminals of tweeter 20*b*. The capacitor 74 and inductor 78 also form a second order Butterworth filter with a 12 dB/octave roll-off. Additionally, the positive (+) and negative (−) audio input terminals 34*b* are electrically coupled to a second pair of terminals 58*b* of the switch device 59 through leads 79. Similarly, the in circuit audio input terminals 34*b*, dual voice coil woofer 22 and tweeter 20*b* form a second speaker section within speaker system 10 that is shown generally at 62*b*. The fuses 50, 72, inductors 44, 56, 66, 78, capacitors 52, 74 and resistors 54, 76 are each mounted on the printed circuit board 38 provided on the rear of speaker system 10.

In the single speaker environment of FIGS. 2 and 2A, the switch device 59 is moved by the user to the "open" position as shown in FIG. 2A. In this configuration, left channel audio information from the left channel audio signals 36*a* is reproduced by one voice coil (not shown) within the dual voice coil woofer 22 and the first independent tweeter 20*a*, while right channel audio information is simultaneously reproduced by the second voice coil (not shown) within the dual voice coil woofer 22 and the second independent tweeter 20*b*. Thus, in this configuration, speaker system 10 is configured to reproduce a complete left and right channel audio program from a single speaker so audio information is not discarded or sacrificed by the speaker system 10 during the sound reproduction. Moreover, the woofer 22 is operable to handle lower frequencies of the audio program with high-fidelity, while the tweeters 20*a*, 20*b* are operable to reproduce the higher frequencies of the audio program also with high-fidelity. Thus, the speaker system 10 is operable to reproduce the full frequency spectrum of the audio program generated by the audio source 12 without significant distortion.

Figure 3:
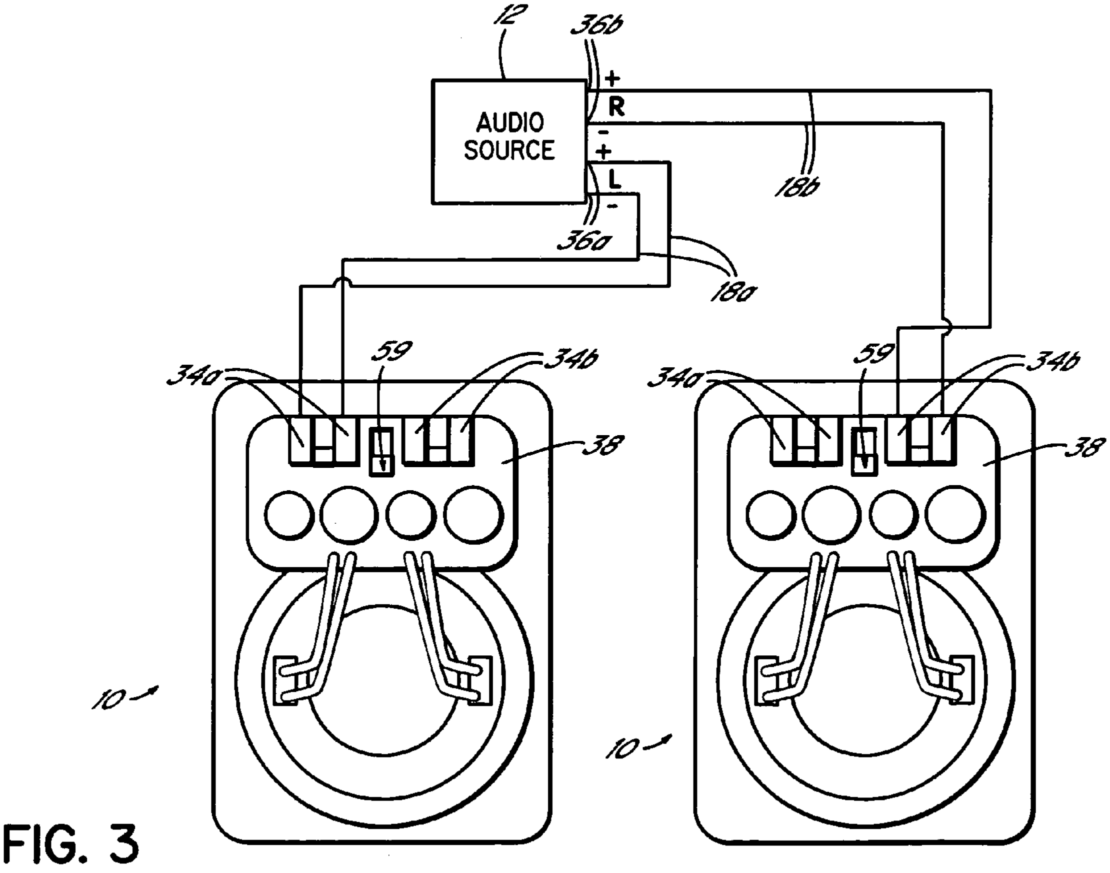
FIG. 3 is a rear view similar to FIG. 2 illustrating a pair of speaker systems coupled to an audio source.
Figure 3A:
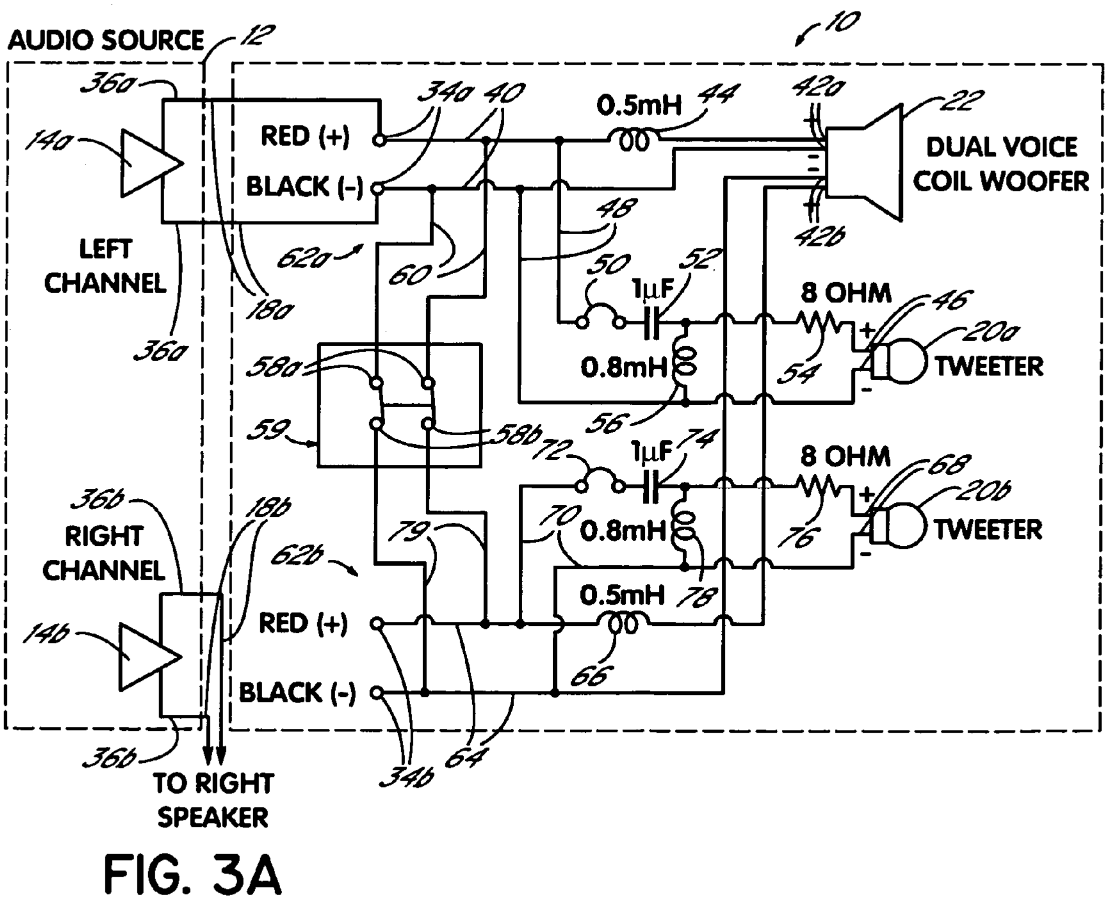
FIG. 3A is a view similar to FIG. 2A showing one of the speaker systems of FIG. 3 coupled to the audio source.

Referring now to the true stereo acoustic environment illustrated in FIGS. 3 and 3A, a pair of speaker systems 10 are coupled to the audio source 12 to independently reproduce right and left channel audio information along separate right and left audio axes. However, in this user selected second configuration, one speaker system 10 is coupled to the left channel audio signals 36*a* of audio source 12, while the other speaker system 10 is independently coupled to the right channel audio signals 36*b* of audio source 12. As shown in FIG. 3A, the left speaker system 10 is coupled to the left channel audio signals 36*a* through the pair of speaker wires 18*a*, and the right channel audio signals 36*b* of audio source 12 are coupled independently to the right speaker system 10 through the pair of speaker wires 18*b* (FIG. 3). For true stereo environments, the switch device 59 in each speaker system 10 is moved by the user to the "closed" position as shown in FIG. 3A. In this configuration, left channel audio information from the left channel audio signals 36*a* is reproduced in the left speaker system 10 (FIGS. 3 and 3A) by both voice coils (not shown) of the dual voice coil woofer 22 and both tweeters 20*a*, 20*b* of the left speaker, while right channel audio information is reproduced independently in the right speaker system 10 (FIG. 3) by both voice coils (not shown) of the dual voice coil woofer 22 and both tweeters 20*a*, 20*b* of the right speaker.

More particularly, audio input terminals 34*a* of left speaker system 10 (FIGS. 3 and 3A) are electrically coupled to the left channel audio signals 36*a* of audio source 12. As shown in FIG. 3A, the positive (+) and negative (−) audio input terminals 34*a* are electrically coupled through the leads 40 to respective positive (+) and negative (−) terminals 42*a* of one of the two independent voice coils (not shown) within the dual voice coil woofer 22. The positive (+) and negative (−) audio input terminals 34*a* are also electrically coupled to respective positive (+) and negative (−) terminals 42*b* of the second independent voice coil (not shown) within the dual voice coil woofer 22 through the leads 40, leads 60 and 79 coupled to the "closed" switch device 59, and leads 64 coupled to the respective positive (+) and negative (−) terminals 42*b* of the second independent voice coil within the dual voice coil woofer 22.

The positive (+) and negative (−) audio input terminals 34*a* are also electrically coupled to respective positive (+) and negative (−) terminals 46 of tweeter 20*a* through leads 48 coupled to leads 40. Additionally, the positive (+) and negative (−) audio input terminals 34*a* are electrically coupled to the respective positive (+) and negative (−) terminals 68 of the second tweeter 20*b* of the tweeter pair through leads 40, leads 60 and 79 coupled to the "closed" switch device 59, leads 64, and leads 70 coupled to the respective positive (+) and negative (−) terminals 68 of the second tweeter 20*b*. It will be appreciated that the right speaker system 10 (FIG. 3) is similarly coupled to the right channel audio signals 36*b* of audio source 12 so that the right speaker system 10 is operable to reproduce right channel audio information through its dual voice coil woofer 22 and pair of tweeters 20*a*, 20*b* as described in detail above in connection with the left speaker system 10. Thus, in this user selected configuration of the right and left speaker systems 10, each right and left speaker is configured to independently reproduce respective left or right channel audio information so that the pair of speakers 10 provide a true stereo listening environment to the user with high-fidelity.

In the first user selected speaker configuration of FIGS. 2 and 2A in which switch device 59 is moved to the "open" position and only a single speaker system 10 is coupled to audio source 12 to simultaneously reproduce both right and left channel audio information from the same speaker, each of the two speaker sections 62*a*, 62*b* receives half power from the audio source 12 so that full rated power is delivered to the single speaker system 10 at 16 ohms. However, in the second user selected speaker configuration of FIGS. 3 and 3A in which switch device 59 is moved to the "closed" position and a pair of speaker systems 10 are coupled to audio source 12 to independently reproduce both right and left channel audio information, full rated power is delivered to each speaker system 10 at 8 ohms. In this way, the net power delivered to each speaker system 10 is the same regardless of the user selected configuration of the speaker through switch device 59. Thus, the sound pressure level from the speaker system 10 is the same in either of the two user selected configurations of the speaker. In a preferred embodiment of the present invention, each speaker system 10 has the following performance characteristics:

| | |
|---|---|
| Frequency Response: 55-21,000 Hz ± 3 dB | |
| Sound Pressure Level at 1 Meter with 1 Watt Input: 88 dB ± 2 dB | |
| Power Handling Capacity: | 100 Watts as per Electronic Industry Association (EIA) Testing Standard RS-426-A |
| Impedance: 8 Ohms ± 15% | |
| Cross-Over Frequency: 3,000 Hz | |
| Woofer Resonant Frequency: 45 Hz | |

It will thus be appreciated that speaker system 10 in accordance with the principles of the present invention is well suited to handle a wide range of audio frequencies and reproduce an audio program with high-fidelity through the use of the dual voice coil woofer 22 and the pair of tweeters 20*a*, 20*b*. In this way, speaker system 10 is operable to reproduce an audio program without significant distortion or loss of audio information. Moreover, it will be appreciated that speaker system 10 is versatile for use in a wide range of acoustic environments in which a single or multiple speakers may be required.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

Having described the invention, I claim:

1. A reconfigurable speaker system for producing sound in response to at least one of a right channel audio signal and a left channel audio signals generated by an audio source, comprising:

- a first audio driver operable to produce sound in response to at least one of said right channel audio signal and said left channel audio signal;
- a pair of second audio drivers each operable to produce sound in response to at least one of said right channel audio signal and said left channel audio signal;
- a first audio signal input adapted to receive one of said right channel audio signal and said left channel audio signal, said first audio signal input being coupled to said first audio driver and further being configured to be selectively coupled to one or both of said pair of second audio drivers; and
- a second audio signal input adapted to receive the other of said right channel audio signal and said left channel audio inputs, said second audio signal input being coupled to said first audio driver and further being configured to be selectively coupled to one or both of said pair of second audio drivers.

2. The speaker system of claim 1 further comprising a switch device in circuit with said first and second audio signal inputs and said first and second audio drivers.

3. The speaker system of claim 2 wherein said switch device is selectively positionable in first and second positions.

4. The speaker system of claim 3 wherein in said first position of said switch device, said first audio driver is configured to produce sound in response to both of said right and left channel audio signals, and each of said pair of second audio drivers is configured to produce sound in response to a respective one of said right and left channel audio signals, and further wherein in said second position of said switch device, said first audio driver is configured to produce sound in response to only one of said right and left channel audio signals, and both of said pair of second audio drivers are configured to produce sound in response to said only one of said right and left channel audio signals.

5. The speaker system of claim 1 wherein said first audio driver comprises a dual voice coil audio driver.

6. The speaker system of claim 5 wherein said first audio driver comprises a woofer.

7. The speaker system of claim 1 wherein each of said second audio drivers comprises a single voice coil audio driver.

8. The speaker system of claim 7 wherein each of said second audio drivers comprises a tweeter.

9. The speaker system of claim 1 wherein each of said first and second audio signal inputs comprises a pair of electrical terminals.

10. The speaker system of claim 9 wherein said switch device comprises a double pole, single throw mechanical switch.

11. A reconfigurable speaker system for producing sound in response to at least one of right and left channel audio signals generated by an audio source, comprising:

- a first audio driver operable to produce sound in response to at least one of said right and left channel audio signals;

a pair of second audio drivers each operable to produce sound in response to at least one of said right and left channel audio signals; and a switch device in circuit with said first and second audio drivers and being selectively positionable in first and second positions, wherein in said first position of said switch device, said first audio driver is configured to produce sound in response to both of said right and left channel audio signals, and each of said pair of second audio drivers is configured to produce sound in response to a respective one of said right and left channel audio signals, and further wherein in said second position of said switch device, said first audio driver is configured to produce sound in response to only one of said right and left channel audio signals, and both of said pair of second audio drivers are configured to produce sound in response to said only one of said right and left channel audio signals.

12. The speaker system of claim 11 wherein said first audio driver comprises a dual voice coil audio driver.

13. The speaker system of claim 12 wherein said first audio driver comprises a woofer.

14. The speaker system of claim 11 wherein each of said second audio drivers comprises a single voice coil audio driver.

15. The speaker system of claim 14 wherein each of said second audio drivers comprises a tweeter.

16. The speaker system of claim 11 wherein said switch device comprises a double pole, single throw mechanical switch.

17. A reconfigurable speaker system for producing sound in response to at least one of right and left channel audio signals generated by an audio source, comprising:

a first audio signal input adapted to receive one of said right and left channel audio signals;

a second audio signal input adapted to receive the other of said right and left channel audio signals;

a first audio driver coupled to both of said first and second audio signal inputs and operable to produce sound in response to at least one of said right and left channel audio signals;

a pair of second audio drivers each coupled respectively to at least one of said first and second audio signal inputs and operable to produce sound in response to at least one of said right and left channel audio signals; and a switch device in circuit with said first and second audio signal inputs and said first and second audio drivers, and being selectively positionable in first and second positions, wherein in said first position of said switch device, said first audio driver is configured to produce sound in response to both of said right and left channel audio signals, and each of said pair of second audio drivers is configured to produce sound in response to a respective one of said right and left channel audio signals, and further wherein in said second position of said switch device, said first audio driver is configured to produce sound in response to only one of said right and left channel audio signals, and both of said pair of second audio drivers are configured to produce sound in response to said only one of said right and left channel audio signals.

18. The speaker system of claim 17 wherein said first audio driver comprises a dual voice coil audio driver.

19. The speaker system of claim 18 wherein said first audio driver comprises a woofer.

20. The speaker system of claim 17 wherein each of said second audio drivers comprises a single voice coil audio driver.

21. The speaker system of claim 20 wherein each of said second audio drivers comprises a tweeter.

22. The speaker system of claim 17 wherein each of said first and second audio signal inputs comprises a pair of electrical terminals.

23. The speaker system of claim 22 wherein said switch device comprises a double pole, single throw mechanical switch.

24. A reconfigurable speaker system for producing sound in response to at least one of right and left channel audio signals generated by an audio source, comprising:

a first speaker circuit including a woofer and a first tweeter coupled in circuit;

a second speaker circuit including said woofer and a second tweeter coupled in circuit; and a switch device in circuit with said first and second speaker circuits, and being selectively positionable in first and second positions, wherein in said first position of said switch device, said woofer is configured to produce sound in response to both of said right and left channel audio signals, and each of said first and second tweeters is configured to produce sound in response to a respective one of said right and left channel audio signals, and further wherein in said second position of said switch device, said woofer is configured to produce sound in response to only one of said right and left channel audio signals, and both of said first and second tweeters are configured to produce sound in response to said only one of said right and left channel audio signals.

* * * * *